Dec. 10, 1968 W. E. BRENEMAN 3,416,039

TEMPERATURE-RESPONSIVE CONTROL CIRCUIT

Filed June 15, 1966

INVENTOR.
Walter E. Breneman
BY
James J. Jennings, Jr.
Attorney

1

3,416,039

TEMPERATURE-RESPONSIVE CONTROL CIRCUIT

Walter E. Breneman, York, Pa., assignor to Borg-Warner Corporation, Chicago, Ill., a corporation of Illinois Filed June 15, 1966, Ser. No. 557,780

6 Claims. (Cl. 317—132)

Figures 1, 2:
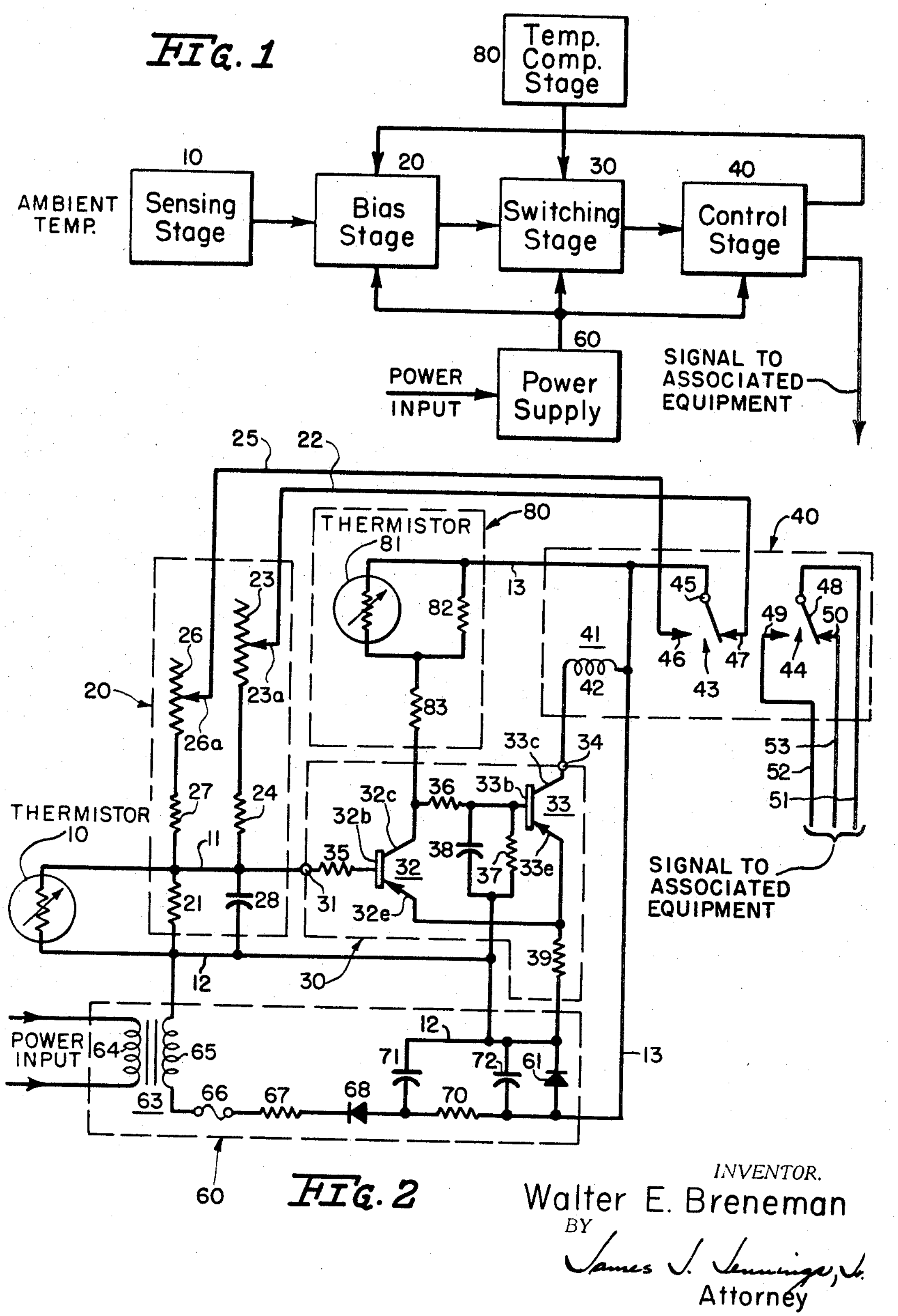

The present invention is directed to a temperature-responsive control circuit, and more particularly to such a circuit which includes components that are always returned to a fail-safe position upon failure of the supply voltage, or failure of some component in the circuit.

Such control circuits find utility in a multiplicity of different environments, such as the switching of refrigerators between the high and low cooling positions in response to the temperature sensed within the box, or control of a thermoelectric module in a first sense to effect the freezing of ice cubes and in a second sense to provide sufficient heat to free the ice cubes from the tray, and analogous systems. When an ice cube maker is regulated, it is desirable that upon failure of the commercial supply voltage or breakdown of any part in the temperature-responsive control system, that the control signal to the thermoelectric module place the unit in the cooling cycle. If the heating (or ice "harvesting") cycle were inadvertently carried out after failure of a system component or of the supply voltage, the equipment would dump only liquid or partially melted ice into the storage bin.

It is therefore a principal object of the present invention to provide a control system which is useful to regulate the making of ice cubes with high accuracy, by avoiding the dumping of water or partically frozen cubes in the event of circuit failure or a failure of the supply voltage.

A temperature-responsive control circuit constructed and connected in accordance with the inventive teaching includes a switching stage which has input and output connections; in a preferred embodiment this stage was a Schmitt trigger circuit. A bias stage is provided, and this stage includes a voltage divider arrangement which has a reference component such as a resistor coupled between the input connection of the switching stage and a first energizing conductor, that is, one of the conductors over which energy is supplied. A first leg of the voltage divider arrangement is coupled between a first control conductor and the input connection of the switching stage. The voltage divider also includes a second leg which is coupled between a second control conductor and the same input connection of the switching stage. A control stage is provided and includes switching means such as a relay, having a control portion or winding which is coupled between the output connection of the switching stage and a second energizing conductor. The relay has first and second contact sets, the first of which is connected to couple the second energizing conductor to one of the first and second control conductors (respectively associated with the first and second legs of the voltage divider arrangement). The second contact set is connected to pass control signals to associated equipment, such as ice cube freezing and harvesting apparatus. A power supply is provided and connected to pass energy to the first and second energizing conductors. A sensing means, such as a thermistor, is coupled between the input connection of the switching stage and the first energizing conductor. Such sensing means operates, responsive to a change in the ambient temperature, to provide a related change in the resistance of the sensing means which modifies the voltage distribution along the voltage divider arrangement to regulate operation of the switching stage, and thus control the signal passed from the control stage to the associated equipment.

2

The features of this invention which are believed to be novel are set forth with particularity in the appended claims. The invention, together with further objects and advantages thereof, may best be understood by reference to the following description taken in conjunction with the accompanying drawing, in the several figures of which like reference numerals identify like elements, and in which:

FIGURE 1 is a block diagram of a control circuit intercoupled in accordance with the inventive teaching; and FIGURE 2 is a schematic diagram illustrating in detail circuitry shown generally in block form in FIGURE 1.

*General arrangement*

As shown in FIGURE 1 a sensing stage 10 is provided to sense the ambient temperature and provide a signal to bias stage 20, which in turn governs switching stage 30. Switching stage 30 is effective to regulate operation of control stage 40, which both passes a signal to associated equipment and provides a feedback signal to bias stage 20 which determines which of two legs will be effective in a voltage divider arangement. A power supply unit 60 receives input energy from a conventional source and effects the energization of stages 20–40. Although not requisite for the effective operation of the inventive circuit, a temperature compensating stage 80 is provided and coupled to switching stage 30 to compensate for temperature variations in the vicinity of the circuit components as distinguished from the ambient temperature sensed adjacent stage 10. With this general perspective of the invention, a more detailed description will now be set forth.

*Circuit arrangement*

As shown in FIGURE 2 the sensing stage 10 is comprised of a thermistor, which is a well known unit having a temperature coefficient of resistivity such that the effective resistance of the unit changes as a function of changes in the ambient temperature adjacent the unit. In the present invention thermistor 10 was chosen to have a positive temperature coefficient of resistivity, and is coupled between a common conductor 11 and a first energizing conductor 12.

Bias stage 20 includes a voltage divider arrangement having a reference component 21 coupled between input connection 31 of the switching stage and conductor 12. It is understood that exactly the same electrical potential which is present at input connection 31 appears all along conductor 11 to the top of thermistor 10, and thus the potential on common conductor 11 is applied to input connection 31. A first leg of the voltage divider arrangement is coupled between a first control conductor 22 and conductor 11. This first leg comprises a series circuit including a potentiometer 23 having an adjustable arm or movable tap 23*a*, and a resistor 24. Likewise a second leg of the voltage divider arrangement is coupled between a second control conductor 25 and conductor 11; this second leg also includes a series circuit comprised of a potentiometer 26 which has a movable arm 26*a*, and a resistor 27. A capacitor 28 is coupled between conductors 11 and 12 in the bias stage.

Within switching stage 30 a flip-flop or Schmitt trigger circuit includes a pair of transistors 32 and 33 shown coupled between input connection 31 and output connection 34. Each of the transistors has base, emitter, and collector elements referenced by *b*, *e*, and *c*, respectively. Although PNP type transistors are depicted, those skilled in the art will appreciate that NPN type units could be utilized with the appropriate reversal of the signal and supply voltage polarities, and other components such as vacuum tubes can likewise be employed. An input resistor 35 is coupled between input connection 31 and base 32*b*. Collector 32*c* is coupled through a resistor 36 to base 33*b*. The parallel-connected circuit comprised of resistor 37 and capacitor 38 is coupled between first energizing conductor 12 and the common electrical connection between resistor 36 and base 33*b*. The two emitters 32*e*, 33*e* are coupled together and, through resistor 39, to the junction of a Zener diode 61 and conductor 12 in power supply 60.

Control stage 40 includes a relay or switching means 41 having a control portion shown as winding 42, and a first and second contact sets 43, 44. First contact set 43 comprises a movable contact 45 and a pair of fixed contacts 46, 47. Second contact set 44 includes a movable contact 48 and a pair of fixed contacts 49, 50. Conductors 51, 52 and 53 are respectively coupled to the contacts 48–50 of contact set 44 to pass signals to associated equipment (not shown), thus to regulate the cooling and ice harvesting cycles of such equipment.

In the first contact set 43, fixed contacts 47 and 46 are respectively coupled to the first and second control conductors 22 and 25. A second energizing conductor 13 extends from power supply 60 to one side of winding 42, to movable contact 45, and to one side of temperature compensating stage 80.

In stage 80 a parallel circuit comprising a thermistor 81 and a resistor 82 is coupled to conductor 13, and the other side of this paralle circuit 81, 82 is coupled through a resistor 83 to tthe common electrical connection between resistor 36 and collector 32*c* in switching stage 30.

Power supply circuit 60 comprises a transformer 63 having a primary winding 64 and a secondary winding 65; one end of the secondary winding 65 is coupled to first energizing conductor 12. The other side of secondary winding 65 is coupled through a series circuit including a fuse 66, a resistor 67, a diode 68, and a resistor 70 to the second energizing conductor 13. A pair of filter capacitors 71, 72 are provided, and their common connection is coupled both to conductor 12 and to the common connection between resistor 39 and Zener diode 61. The other plate of capacitor 71 is coupled between diode 68 and resistor 70, and the other plate of capacitor 72 is coupled between resistor 70 and Zener diode 61.

*Circuit operation*

It is initially assumed that A-C energy is applied over the power input circuit to primary winding 64 in the power supply, and that power supply circuit 60 operates in a well known manner to provide a unidirectional energizing potential difference between conductors 12 and 13. The polarity of the voltage on conductor 12 is positive with respect to the voltage on conductor 13. It is further assumed that thermistor 10 is sensing a normal room temperature, and that relay 41 is in the cooling cycle position. That is, the signal provided over conductors 51, 53 effects the freezing of ice cubes or some analagous cooling operation. Under these conditions transistor 32 is conducting and transistor 33 is cut off. In this position of contact set 43, the negative potential on conductor 13 is extended over contacts 45, 47 and first control conductor 22 to movable arm 23*a* of potentiometer 23 in the first leg of the voltage divider arrangement. At this time the voltage divider arrangement in effect comprises the portion of potentiometer 23 between arm 23*a* and its lower connection, resistor 24, and reference component or resistor 21. The potential appearing at the common connection between resistors 21, 24 is applied over conductor 11, input connection 31 and resistor 35 to base 32*b* in the switching stage. Thus the transition point from cooling to ice harvesting is determined by the setting of arm 23*a* on potentiometer 23.

As the cooling continues the temperature sensed by thermistor 10 decreases and the effective resistance of this unit correspondingly decreases, shunting the effective resistance of component 21. This decreasing resistance causes the potential appearing at input connection 31 to go more positive, until this potential is of the appropriate level to turn off transistor 32. With this turn off, the potential at the junction between resistors 36, 83 rapidly goes negative toward the potential on conductor 13, and this change in potential is applied over resistor 36 to base 33*b* to rapidly gate on transistor 33. As transistor 33 is switched on current flows from second energizing conductor 13 through winding 42, the collector-emitter path of transistor 33, and resistor 39 to first energizing conductor 12. Accordingly, relay 41 operates and at its contacts 45, 47 interrupts the circuit which previously coupled first leg 23, 24 in series with the reference resistor 21 of the voltage divider arrangement, and at its contacts 45, 45 completes a circuit which extends the negative potential from second energizing conductor 13 over contacts 45, 46 and second control conductor 25 to place second leg 26, 27 of the voltage divider arrangement in series with reference component 21. It is emphasized that this type of transition between the different legs which are coupled in series with resistor 21, to vary the parameters in the control arrangement for regulating operation of the Schmitt trigger circuit, precludes any chatter or erroneous fluctuation of the relay operation.

In this operation relay 41 also, at its contacts 48, 50, interrupts the signal previously passed over conductors 51, 53 to dictate that the associated equipment be in the cooling cycle, and at its contacts 48, 49 completes the circuit over conductors 52, 53 to place the equipment in the ice harvesting or heating cycle. As the associated equipment heats the ice very slightly to loosen it from the receptacle and dump it into the bin, the temperature sensed by thermistor 10 likewise increases and the resistance of the thermistor correspondingly increases, causing the potential on common conductor 11 to go more negative. It is noted that the transition point from harvesting to freezing is regulated by adjustment of the position of arm 26*a* on potentiometer 26. At a certain point the potential on conductor 11 will be sufficiently negagtive so that, as supplied over input connection 31 and resistor 35 to base 32*b*, transistor 32 is rapidly gated on to effect current flow through resistor 83 toward conductor 13, and the voltage applied over resistor 36 to base 33*b* rapidly goes positive to effectively cut off transistor 33 and thus deenergize relay 41. Accordingly at this time the relay contact sets 43, 44 fall back to the position illustrated in FIGURE 2.

Thermistor 81 operates in a well known manner to provide the requisite temperature compensation of the circuit. Thermistor 81 is chosen with a temperature coefficient of resistivity which is negative, that is, is opposite in sense to the coefficient of resistivity exhibited by thermistor 10. Such selection and interconnection of these elements are now well known and understood in this art.

It is noted that if sensing thermistor 10 becomes defective or is inadvertently disconnected from the circuit, relay 41 will remain in the illustrated position or go to this position if it were previously in the energized (ice harvesting) position. If no power input is supplied to transformer 63, then relay 41 will remain in the illustrated position and the equipment will be in the cooling cycle. Likewise if some part becomes defective within the circuit fuse 66 will blow and the equipment will go to the cooling cycle, or remain in that cycle if it is already so connected. If the equipment is in the heating or ice harvesting cycle with second leg 26, 27 coupled in series with resistor 21, and if the line voltage supplied to transformer 63 is temporarily interrupted, the other leg 23, 24 is automatically coupled into series with resistor 21 as the equipment is returned to the cooling cycle and thus the dumping of liquid or half melted ice into the storage bin is prevented. Accordingly the advantage of having the transitions or switching points of the equipment set wide apart by the different legs in the bias stage 20 rather than depend upon the fluctuations of the temperature-sensing element 10 is apparent.

Solely to enable those skilled in the art to make and use the invention, and in no sense by way of limitation, a table of illustrative values found suitable for constructing and operating the circuit of the invention is set out below.

| Component: | Identification or value |
|---|---|
| Thermistor **10** | Carborundum Company, positive, D1406P–8, 5900 ohms ±10% at 25° C. |
| Thermistor **81** | Veco, negative, 33D8. |
| Transistor **32** | GE 2N188A. |
| Transistor **33** | GE 2N188A. |
| Diode **61** | 1N526A (Zener). |
| Diode **68** | 1N2069. |
| Fuse **66** | 0.25 ampere. |
| Potentiometer **23** | 750 ohms, 2 watts, Clarostat A43. |
| Potentiometer **26** | 2,000 ohms, 2 watts, Clarostat A43. |
| Resistors— | |
| **21** | 2700 ohms, 1 watt. |
| **24** | 470 ohms, 1 watt. |
| **27** | 2,400 ohms, ½ watt. |
| **35** | 18,000 ohms, ½ watt. |
| **36** | 220 ohms, ½ watt. |
| **37** | 4,700 ohms, ½ watt. |
| **39** | 220 ohms, ½ watt. |
| **67** | 10 ohms, 1 watt. |
| **70** | 22 ohms, 1 watt. |
| **82** | 3,900 ohms, ½ watt. |
| **83** | 2,700 ohms, ½ watt. |
| Capacitors— | |
| **28** | 25 microfarads, 25 volts, Sprague #1207. |
| **38** | 25 microfarads, 25 volts, Sprague #1207. |
| **71** | 25 microfarads, 25 volts, Sprague #1207. |
| **72** | 50 microfarads, 25 volts, Sprague #1209. |
| Relay **41** | Sigma relay 22 RJCC 1000G-Sil. |
| Transformer **63** | Nutone 16 volt Mod. 101N. |

The voltage from bias circuit 20 is applied to base **32*b* through resistor 35, which resistor limits the base current. Resistor 21 is part of the voltage divider arrangement irrespective of which of the legs 23, 24 or 26, 27 is then in circuit with it; resistor 21 limits the voltage applied to resistor 35 in the event thermistor 10 is disconnected. Capacitor 28 filters out any transient voltages induced in the Thermistor leads and adds a short time delay to the operating period of the control arangement. Capacitor 38 also provides a short time delay, and prevents relay 41 from inadvertent energization which might occur momentarily when the line voltage is applied over transformer 63 to the remainder of power supply 60. The use of Zener diode 61 maintains a substantially constant potential difference across the energizing leads 12, 13. Thus a sharp transition in voltage is provided across relay winding 42** during the switching time, assuring a definite change between the on and off conditions that is not obtainable by a gradual increase or slow decrease of the voltage level applied to the relay winding.

While only a particular embodiment of the present invention has been described and illustrated, it is apparent that changes and modifications may be made therein without departing from the invention in its broader aspects. The aim of the appended claims therefore is to cover all such changes and modifications as fall within the true spirit and scope of the invention.

What is claimed is:

1. A temperature-responsive control circuit comprising:

a switching stage having input and output connections;

a bias stage including a voltage divider arrangement having a reference component coupled between said input connection of the switching stage and a first energizing conductor, a first leg coupled between a first control conductor and said input connection of the switching stage, and a second leg coupled between a second control conductor and said input connection of the switching stage;

a control stage including switching means having a control portion coupled between said output connection of the switching stage and a second energizing conductor, and first and second contact sets, said first contact set being connected to couple said second energizing conductor to one of said first and second control conductors, and said second contact set being connected to pass control signals to associated equipment;

a power supply connected to pass energy over said first and second energizing conductors; and sensing means, coupled between said input connection of the switching stage and said first energizing conductor, operative responsive to a change in ambient temperature to provide a related change in the resistance of the sensing means and modify the voltage distribution along said voltage divider arrangement to operate said switching stage.

2. A temperature-responsive control circuit as claimed in claim 1 in which said bias stage includes a first resistor as said reference component, said first leg includes a potentiometer, and said second leg of the bias stage includes another potentiometer, the settings of the movable taps on said potentiometers being effective to determine the switching points in operation of said control circuit.

3. A temperature-responsive control circuit as claimed in claim 1 and in which said switching means in the control stage is a relay, said control portion is the relay winding, and each of said first and second contact sets are actuated between their respective positions in response to energization and deenergization of the relay.

4. A temperature-responsive control circuit as claimed in claim 1 and in which said second contact set of the switching means is connected to provide a predetermined signal to associated equipment responsive to a failure of a circuit component or to failure or removal of said sensing means.

5. A temperature-responsive control circuit for passing a first signal to regulate cooling to associated ice making equipment and passing a second signal to regulate ice harvesting in the associated equipment, comprising:

a switching stage having input and output connections;

a common conductor coupled to said input connection;

first and second energizing conductors;

a power supply, including a fuse disposed for failure responsive to failure of a component within said control circuit, connected to apply a potential difference between said first and second energizing conductors;

a bias stage including a voltage divider arrangement having a reference resistor coupled between said common conductor and said first energizing conductor, a potentiometer coupled between a first control conductor and said common conductor, and a second potentiometer coupled between a second control conductor and said common conductor, the one of said first and second potentiometers in circuit with said resistor determining the transition point at which said switching stage is switched on and off;

a control stage including a relay having a winding coupled between said output connection of the switching stage and said second energizing conductor, and first and second contact sets disposed for actuation between respective first and second positions as said relay is energized and deenergized, said first contact set being connected to couple said second energizing conductor to one of said first and second control conductors and thus determine which of said potentiometers is then in circuit with said reference resistor, and said second contact set being connected to pass control signals to the associated equipment to determine which of the cooling and ice harvesting cycles is then in effect; and temperature-sensing means, coupled between said common conductor and said first energizing conductor, operative responsive to a change in ambient temperature to provide a related change in the effective resistance of said temperature-sensing means, thereby to modify the voltage distribution along said voltage divider arrangement and effect operation of said switching stage.

6. A temperature-responsive control circuit as claimed in claim 5 and further comprising a temperature compensation stage including a first resistor having first and second end portions, one of said end portions being coupled to said switching stage, a second temperature-sensing means coupled between said other end portion of the first resistor and said second energizing conductor, said second temperature-sensing means having a temperature coefficient of resistivity which varies in a sense opposite to the sense in which the coefficient of the first temperature-sensing means varies, and a second resistor coupled in parallel with said second temperature-sensing means.

References Cited

UNITED STATES PATENTS

| | | | |
|---|---|---|---|
| 3,222,578 | 12/1965 | Thiele | 317—148.5 |
| 3,246,210 | 4/1966 | Lorenz | 317—132 X |
| 3,248,892 | 5/1966 | Sutton et al. | 317—132 X |

LEE T. HIX, *Primary Examiner.*

J. A. SILVERMAN, *Assistant Examiner.*

U.S. Cl. X.R.

317—148.5